United States Patent
Tomasi et al.

(10) Patent No.: US 7,050,177 B2
(45) Date of Patent: May 23, 2006

(54) METHOD AND APPARATUS FOR APPROXIMATING DEPTH OF AN OBJECT'S PLACEMENT ONTO A MONITORED REGION WITH APPLICATIONS TO VIRTUAL INTERFACE DEVICES

(75) Inventors: Carlo Tomasi, Palo Alto, CA (US); Salih Burak Gokturk, Mountain View, CA (US)

(73) Assignee: Canesta, Inc., Sunnyvale, CA (US)

( * ) Notice: Subject to any disclaimer, the term of this patent is extended or adjusted under 35 U.S.C. 154(b) by 446 days.

(21) Appl. No.: 10/245,925

(22) Filed: Sep. 17, 2002

(65) Prior Publication Data

US 2003/0218760 A1 Nov. 27, 2003

Related U.S. Application Data

(60) Provisional application No. 60/382,899, filed on May 22, 2002.

(51) Int. Cl.
*G01B 11/24* (2006.01)
*G09G 5/00* (2006.01)

(52) U.S. Cl. .................. 356/614; 345/156; 345/158

(58) Field of Classification Search ........ 356/614–623, 356/4.07; 345/157, 173–183; 178/18.01, 178/18.02, 18.09; 250/221
See application file for complete search history.

(56) References Cited

U.S. PATENT DOCUMENTS

| | | | |
|---|---|---|---|
| 3,610,754 A | 10/1971 | Pirlet | |
| 3,857,022 A | 12/1974 | Rebane et al. | |
| 4,187,492 A | 2/1980 | Deligneres | |
| 4,294,544 A | 10/1981 | Altschuler | |
| 4,312,053 A | 1/1982 | Lipsky | |
| 4,333,170 A | 6/1982 | Mathews et al. | |
| 4,376,301 A | 3/1983 | Roberts | |
| 4,686,655 A | 8/1987 | Hyatt | |
| 4,688,933 A * | 8/1987 | Lapeyre | 356/3.16 |
| 4,716,542 A | 12/1987 | Peltz et al. | |
| 4,956,824 A | 9/1990 | Sindeband et al. | |
| 4,980,870 A | 12/1990 | Spivey et al. | |
| 4,986,662 A * | 1/1991 | Bures | 356/621 |
| 5,056,791 A | 10/1991 | Poillon et al. | |
| 5,099,456 A | 3/1992 | Wells | |
| 5,166,905 A | 11/1992 | Currie | |
| 5,174,759 A | 12/1992 | Preston et al. | |
| 5,442,573 A | 8/1995 | Bredberg | |

(Continued)

FOREIGN PATENT DOCUMENTS

EP 0233464 A1 8/1987

(Continued)

OTHER PUBLICATIONS

Naoshi Matsuo et al., "Speaker Position Detection System Using Audio-visual Information," Dec. 1999, XP 000931599, pp. 214-220.

(Continued)

*Primary Examiner*—Hoa Q. Pham
(74) *Attorney, Agent, or Firm*—Shemwell Mahamedi LLP

(57) ABSTRACT

Structured light is directed across a monitored region. An image is captured of a light pattern that forms on the object as a result of the object intersecting the structured light when the object is placed at a first position in the monitored region. A geometric characteristic is identified of the image of the light pattern. The geometric characteristic is variable with a depth of the first position relative to where the image is captured. The depth of the first position is approximated based on the measured geometric characteristic.

43 Claims, 11 Drawing Sheets

U.S. PATENT DOCUMENTS

| | | |
|---|---|---|
| 5,573,077 A | 11/1996 | Knowles |
| 5,617,371 A | 4/1997 | Williams |
| 5,733,031 A | 3/1998 | Lin |
| 5,825,033 A | 10/1998 | Barrett et al. |
| 6,002,435 A | 12/1999 | Yamamoto et al. |
| 6,281,878 B1 * | 8/2001 | Montellese ................ 345/156 |
| 6,421,042 B1 * | 7/2002 | Omura et al. ............... 345/157 |
| 6,650,318 B1 * | 11/2003 | Arnon ........................ 345/168 |
| 6,791,700 B1 * | 9/2004 | Omura et al. ............... 356/620 |
| 2002/0024676 A1 * | 2/2002 | Fukuzaki .................... 356/623 |

FOREIGN PATENT DOCUMENTS

| | | |
|---|---|---|
| EP | 0 370 770 A | 5/1990 |
| EP | 042500 A2 | 4/1991 |
| EP | 0629964 A1 | 12/1994 |
| EP | 0982676 A1 | 3/2000 |
| EP | 1039365 A2 | 9/2000 |
| EP | 1045586 A2 | 10/2000 |
| GB | 1073 503 A | 6/1967 |
| WO | WO 84/00427 A1 | 2/1984 |
| WO | WO 00/19705 A1 | 4/2000 |
| WO | WO 02/21502 A1 | 3/2002 |

OTHER PUBLICATIONS

IBM Corp., "Virtual Keyboard ISB Tech Disclosure Bulletin," Mar. 1990, vol. 32, No. 10B, XP 000097915, pp. 359-360.

A. E. Savakis et al., "Restoration of Real Defocused Images Using Blur Models Based on Geometrical and Diffraction Optics," 1991, IEEE, pp. 919-922.

Ren C. Luo et al., "Defocusing Blur Restoration in Natural Scene Images for Factual Analysis," Nov. 15, 1993, IEEE, pp. 1377-1381.

"Sonar", encyclopedia article from *Wikipedia* (electronic publication, no date).

* cited by examiner

METHOD AND APPARATUS FOR APPROXIMATING DEPTH OF AN OBJECT'S PLACEMENT ONTO A MONITORED REGION WITH APPLICATIONS TO VIRTUAL INTERFACE DEVICES

RELATED APPLICATION AND PRIORITY INFORMATION

This application claims benefit of priority to Provisional U.S. Patent Application No. 60/382,899, entitled "Measurement Of Depth From Thickness Or Separation Of Structured Light With Application To Virtual Interface Devices," filed May 22, 2002, the aforementioned priority application being hereby incorporated by reference in its entirety for all purposes.

This application is related to U.S. application Ser. No. 10/246,123, filed on Sep. 17, 2002, entitled "Method And Apparatus For Approximating Depth Of An Object's Placement Onto A Monitored Region With Applications To Virtual Interface Devices", by Carlo Tomasi and Salih Burak Gokturk.

FIELD OF THE INVENTION

The present invention relates to position detection methods and apparatuses. In particular, the present invention relates to a method and apparatus for approximating depth of an object's placement onto a monitored region with applications to virtual interface devices.

BACKGROUND OF THE INVENTION

It is often desirable to use virtual input devices to input command and/or data into electronic systems, such as for example a computer system, a musical instrument, or a telephone. For example, although computers can now be implemented in almost pocket-size form factors, inputting data or commands on a mini-keyboard can be time consuming, awkward, and error prone. While many cellular telephones today can handle e-mail communication, actually inputting messages using their small touch pads can be difficult. A personal digital assistant (PDA) has much of the functionality of a computer but suffers from a tiny or non-existent keyboard.

Some interest has been shown to develop virtual interfaces for such small form-factor devices. A device with a virtual interface could determine when a user's fingers or stylus contacts a virtual keyboard, and what fingers contacted what virtual keys. The output of the system could perhaps be input to a device such as a PDA, in lieu of data that could otherwise be received by a mechanical keyboard. (The terms "finger" or "fingers", and "stylus" are used interchangeably throughout this application.) In this example a virtual keyboard might be a piece of paper, perhaps that unfolds to the size of a keyboard, with keys printed thereon, to guide the user's hands. It is understood that the virtual keyboard or other input device is simply a work surface and has no sensors or mechanical or electronic components. The paper and keys would not actually input information, but the interface of the user's fingers with portions of the paper, or if not paper, portions of a work surface, whereon keys would be drawn, printed, or projected, could be used to input information to the PDA. A similar virtual device and system might be useful to input e-mail to a cellular telephone. A virtual piano-type keyboard might be used to play a real musical instrument.

Previously, camera-based systems have been proposed that detect or sense where the user's fingers are relative to a virtual device. These systems achieve their sensing goals in different ways.

U.S. Pat. No. 5,767,848 to Korth (1998) entitled "Method and Device for Optical Input of Commands or Data" attempts to implement virtual devices using a two-dimensional TV video camera. A video camera captures luminosity information, which by itself cannot determine the relative position of an object with respect to a table. Korth processes this luminosity data to (1) distinguish the hands from the background, (2) identify the fingertips of the hands, (3) determine the velocity of the fingers over several frames, and (4) identify when the velocity stops abruptly, in order to determine that the finger has hit the table. Korth would require computation of the contour of a user's fingers, finger position relative to the virtual device, and a determination of finger movement. This method may work in contrived environments, where the background behind the fingers is known, or at least known to have different luminosity from that of the fingers themselves. As a consequence, Korth's camera would have to be placed at some distance from the table, looking down on it. Otherwise, the camera would see the user's palms or shirt, or even the room or environment around the user. This would lead to unpredictable backgrounds, and finger/background separation would be problematic. A down-looking camera is essential for Korth's system also because of a different reason: In order to determine the position of contact of a finger with the plane, the projection rays of Korth's camera must intersect the plane itself, so that a one-to-one correspondence can be established between points on the plane and points in the image. For all these reasons, Korth's camera must be placed several centimeters away from the plane containing the keyboard's active area. A camera that is, say, a mere centimeter away from the plane would have to see the plane at an appreciable angle only for active areas that are a few centimeters away from the camera itself. This would result into very small keyboards, perhaps 3 by 6 centimeters in size.

U.S. Pat. No. 6,115,128 to Vann discloses methods that can capture up to 6 degrees of freedom of the position of an object in space. A solid has six degrees of freedom which are the (x,y,z) position of its center of gravity and the 3 angles that defines its orientation which are the yaw pitch and roll angles. Vann's method is applicable to rigid solids. An object consisting of two solid objects connected by a long string has more than six degrees of freedom. Objects that are composed of a number of solids and objects that are deformable have many more than 6 degrees of freedom. Indeed objects such as a single hand may have in excess of 30 degrees of freedom, not even accounting for the deformation of the fingers as they strike the table. Vann's method are therefore not applicable to hands and fingers.

In European patent number 99111323.4, Carau uses a sensor system that is little more than a stereo camera system that uses horizontal cameras to view fingers or other objects illuminated by a light beam. Carau's system will not provide information from which relevant position can be uniquely determined without ambiguity. Prior art attempts to use conventional two-dimensional cameras are known in the art, and suffer extremely acute occlusion problems in addition to ambiguity-creating problems. Satisfactory operation of such systems requires that each stereo sensor be able to view all user fingers in the region of interest. But in practice, one finger can very easily occlude the sensor-view of another user finger. By definition, stereo cameras such as found in a Carau-type system, are spaced-apart along one axis (e.g., along the left-to-right width of a virtual keyboard), and as a result, finger occlusion is a very real and constant problem. Also, since stereo-camera systems require that both sensors view the user's fingers, the likelihood of occlusion is essentially more than doubled in practice. The occlusion problems would make a stereo system impractical for a virtual input device application.

In U.S. patent application Ser. No. 09/187,903, Dunton describes an image projection system using LCD or DLP to project a keyboard pattern. Dunton suggests that a scanning sensor can be used to detect the movement of user finger. The application suggests that the invention will require-multiple-video cameras (up to three, since more cameras result in better three-dimensional imaging).

SUMMARY OF THE INVENTION

Embodiments of the invention provide for the determination of depth for an object that is placed onto a monitored region. The depth is determined relative to a position where the object is being viewed.

In one embodiment, structured light is directed across a monitored region. An image is captured of a light pattern that forms on the object as a result of the object intersecting the structured light when the object is placed at a first position in the monitored region. A geometric characteristic is identified of the image of the light pattern. The geometric characteristic is variable with a depth of the first position relative to where the image is captured. The depth of the first position is approximated based on the measured geometric characteristic.

In an embodiment, the depth of the first position may be used to determine an input corresponding to the object's placement.

In another embodiment, a series of inputs may be determined by the object being moved from the first position to a second position across the monitored region.

Embodiments of the invention may be implemented with components of an electronic device or computer-readable medium.

In one embodiment, a camera or other light detecting device can be positioned in or near the same plane with which an object's contact occurs. Because the camera can be positioned in this manner, the entire system can be packed into a small form-factor. For example, the entire system can be embedded into a single, very small package. In contrast, structured-light and triangulation systems require by their nature a camera that is well separated from the plane to be observed. Such systems cannot provide for simple small form-factor packaging.

In addition to using methods and techniques described herein for virtual interface applications, embodiments of the invention can be used for a variety of applications and at very different ranges. For instance, an embodiment of the invention can be used in vehicles to determine passenger positions for airbag deployment; in parcel distribution systems to measure the size of objects on a conveyer belt; or in portable three-dimensional scanners, where the beam can be swiped on an object to recover its shape.

BRIEF DESCRIPTION OF THE DRAWINGS

Embodiments of the invention are illustrated by way of example, and not by way of limitation, in the figures of the accompanying drawings. Like reference numerals are intended to refer to similar elements among different figures.

DETAILED DESCRIPTION OF THE INVENTION

Figure 1:
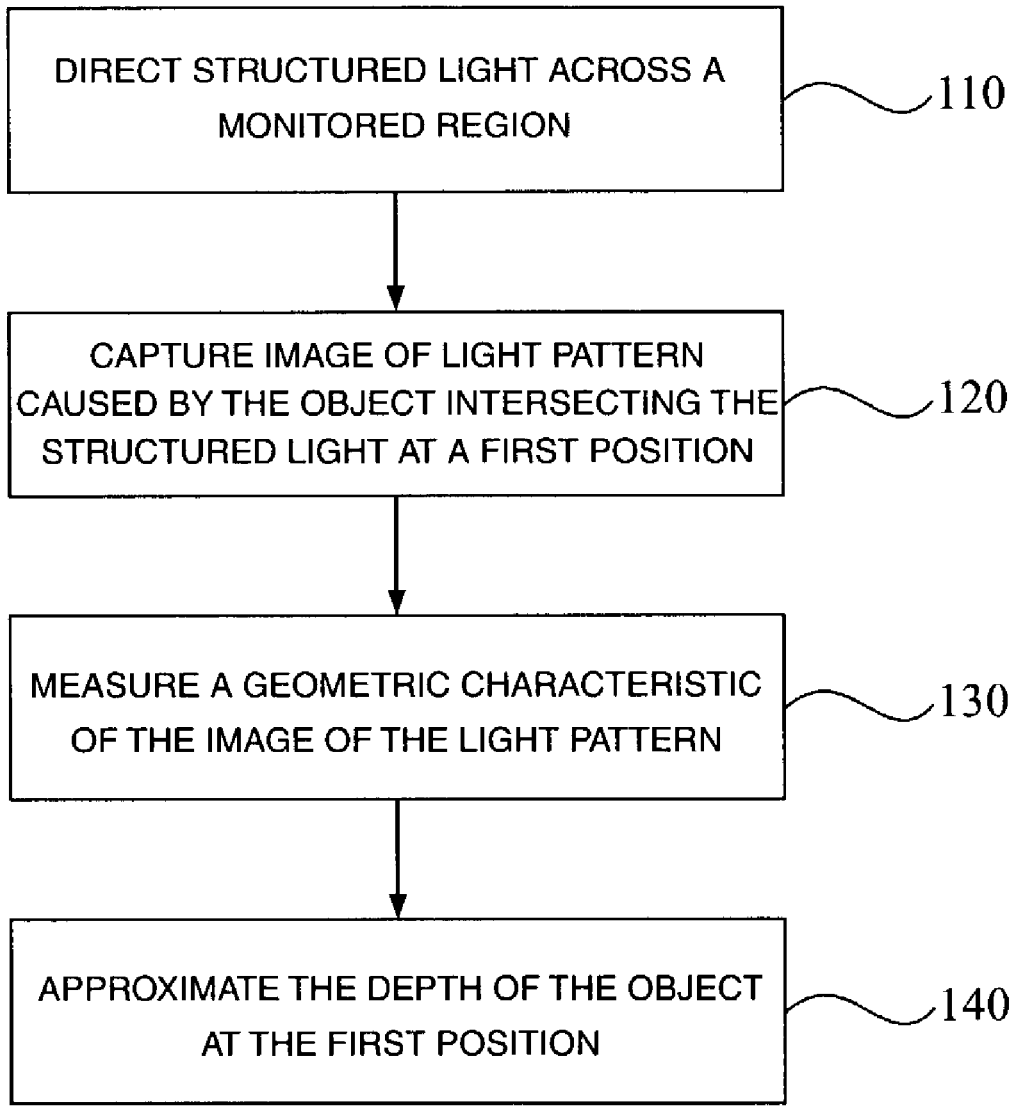
FIG. 1 describes a method for determining a depth of an object's placement, under an embodiment of the invention.

Embodiments of the invention describe methods and apparatuses for approximating depth of an object's placement onto a monitored region with applications to virtual interface devices. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

A. Overview

Embodiments of the invention encompass techniques for the determination of depth of an object that is placed onto a monitored region. The depth is determined relative to a position where the object is being viewed. Embodiments of the invention also include electronic devices that have components for performing such techniques.

An embodiment of the invention may be used to interpret the placement of the object as input into a virtual input device. The virtual input device may be in the form of a keypad, or input region for tracing the path of an object, or other type of virtual interface.

In an embodiment, structured light is directed across a monitored region. An image is captured of a light pattern that forms on the object as a result of the object intersecting the structured light when the object is placed at a first position in the monitored region. A geometric characteristic is identified of the image of the light pattern. The geometric characteristic is variable with a depth of the first position relative to where the image is captured. The depth of the first position is approximated based on the measured geometric characteristic.

An electronic device may be used to implement a method under an embodiment of the invention. The electronic device may include a light detecting device, light sources, and a processor as components.

The object may be user-controlled. Examples of objects include a finger, a stylus or a pointer device.

As used herein, the expression "geometric characteristic" refers to an alterable quality or characteristic of a dimension or shape. In the context of an image of a light pattern, the "geometric characteristic" further refers to the overall shape or size of the image of the light pattern, or to a characteristic of separation for two or more portions of the light pattern. In one embodiment, the geometric characteristic of the image of the light pattern corresponds to a height or dimension of the image of the light pattern. In another embodiment, the geometric characteristic of the image of the light pattern corresponds to a distance between two or more portions of the image of the light pattern, where each portion is formed as the result of an object intersecting a corresponding light beam or section of the structured light. The geometric characteristic is different than an attribute determined from measuring a relative position of where an object is captured relative to a particular viewpoint.

The term "depth" means a depth-wise distance. The depth of an object intersecting the structured light is based on a reference point corresponding to a position of a light detecting device that captures an image of the object.

The term "light detecting device" means a device capable of recording light reflected from an object. An example of a light detecting device includes an image capturing device, such as a camera.

The term "image" means an instance of light recorded on a tangible medium. The image does not have to be a recreation of the reflection, but merely record a characteristic such as brightness, particularly from various points of a surface or area in which a reflection is being created. The tangible medium may refer to, for example, an array of light-sensitive pixels.

B. General Functional Description

FIG. 1 describes a basic method for determining a depth of an object's placement, under an embodiment of the invention. The depth of the object's placement may be part of a process that determines the object's position in two dimensions relative to a reference point. As will be described with other embodiments, the depth of the object's placement may be used as a basis for determining input into an electronic device. Specifically, the depth of the object's placement may be correlated into a virtually entered input for the electronic device.

In step 110, structured light is directed across a monitored region. The structured light may be directed from one or more light sources over the monitored region. The structured light may be focused, such as in the form of a laser or beam. In one embodiment, the structured light is directed as two beams. In another embodiment, the structured light is directed as a single beam. The beams may be fanned in two dimensions over an area that includes the monitored region.

When an object such as a finger or stylus intersects the structured light, light patterns may form on the object. In one embodiment, the light patterns may comprise one or more distinct portions (sometimes referred to herein as "blobs"), where each portion corresponds to the object intersecting one of the light beams, or portions of the structured light attributable to a single source. In another embodiment, the light pattern may be in the form of a single blob that is the result of the object intersecting a single beam.

The wavelength of the structured light is one that is detectable by a light detecting device. In an embodiment, the light beams are infrared, but detectable by a suitably configured light detecting device.

According to an embodiment, the structured light may be operated in conjunction with other light sources that project or otherwise create a virtual input area. Such other light sources may create visual indications of input values or functions that are associated with distinct portions of the monitored region. The movement of an object away from the electronic device may be correlated to a virtual input for the electronic device. For example, a virtual keyboard may be displayed, where each depiction of a key corresponds to a portion of the monitored region that has a value indicated by the image of the key. Alternatively, the keyboard or other input device may be displayed using a surface or platform with markings, but no functional components. In other embodiments, the light is fanned over the area with no visual indications, but object's movements may still be identified as input for the electronic device.

In step 120, an image is captured of the light pattern caused by the object intersecting the structured light at a first position. The object may intersect the structured light to make contact with a surface underlying the monitored region at the first position. A light detecting device such as a camera may be used to capture the image. The light detecting device may include light sensitive materials that can record light reflected off the object as the object intersects the structured light. For example, the light detecting device may include pixels, each of which can record light reflected from one small region of the object from which light is being reflected.

Step 130 provides that a geometric characteristic of the image of the light patterns is measured. The geometric characteristic of the image is one that varies with the position of the object relative to the electronic device. Specifically, the geometric characteristic of the light pattern formed on the captured image is dependent on the depth of where the object is placed relative to where the image of the object is being recorded. In an embodiment where two (or more) light beams are used as the structured light, the geometric characteristic is a distance between two blobs of a light pattern formed by the object intersecting each one of the light beams. Such an embodiment is described in FIG. 2 and FIG. 3, and in FIG. 6 and FIG. 7.

In an embodiment where a single light beam is used, the geometric characteristic is an overall dimension of the light pattern on the image. For example, the characteristic may correspond to a height or length of the image of the light pattern. Such an embodiment is described in FIG. 4 and FIG. 5. Other embodiments may measure geometric characteristics, such as a shape of the image of the light pattern formed as a result of the object intersecting the structured light.

In step 140, the depth of the object at the first position is approximated. The approximated distance is determined based on the measured characteristic of the light pattern's image. The depth is relative to where the image of the object is captured.

In one embodiment, a value of the measured characteristic may be matched to one of a plurality of depth values to approximate the depth of the object at the first position. For example, a look-up table may be used to match the measured characteristic of the light pattern's image to a predetermined value, where the predetermined value is based on an approximation of the actual depth of the object from the light detecting device.

In another embodiment, a value of the measured characteristic may be used to calculate the approximate distance between where the light pattern reflections are originating from, and where the image of the light patterns are being captured. For example, when the measured characteristic corresponds to a gap distance between two light blobs formed on the image of the light pattern, or to an overall dimension of a single light pattern, the gap distance or dimension may be the basis of a calculation that identifies the distance between where the object intersects the structured light and where the image of the light is captured.

Other dimension or coordinates of where an object is placed on the monitored region may be determined in conjunction with determining the depth of the object's placement at the first position. For example, if the monitored region is referenced as a plane, then the depth of the object's placement provides one coordinate on that plane. More traditional methods may be used to determine another coordinate or dimension of the object's placement. For example, the object may be viewed by a light-detecting device. Its viewed position may be used in a calculation to determine placement of the object along an axis that is orthonormal to the direction of depth, and in the reference plane.

Several applications can be implemented based on a method such as described in FIG. 1. One example of an application is a virtual keyboard. The object may correspond to a finger or stylus. The object's placement is interpreted as actuation of one of the keys on the virtual keyboard. The precise key actuated can be determined because the depth of the object's placement is determinable.

Another example of an application for a method such as described in FIG. 1 is to trace the movement of the object over or across two or more positions on the monitored region. Such an application may simulate a pointer, electronic mouse, or mechanical or analog input device. For example, the position of the object may be repeatedly determined in a short time frame of a second or less in order to determine the trajectory of the object over or on the monitored region. The trajectory of the object may then be translated into input that corresponds to a gesture or stroke of a stylus, mouse or finger. Such an embodiment may be implemented by determining the depth of the object at several positions on the monitored region, relative to where the image of the object is being recorded.

C. Mechanisms for Determining Depth of an Object's Placement

FIGS. 2–7 illustrate systems that are configured to determine depth of an object that is placed onto a monitored region. Systems such as described may be integrated into or combined with electronic devices. Examples of devices that may implement such systems include portable computers, such as laptops and personal digital assistants, as well as other electronic devices, such as cellular phones and messaging systems.

Figure 2:
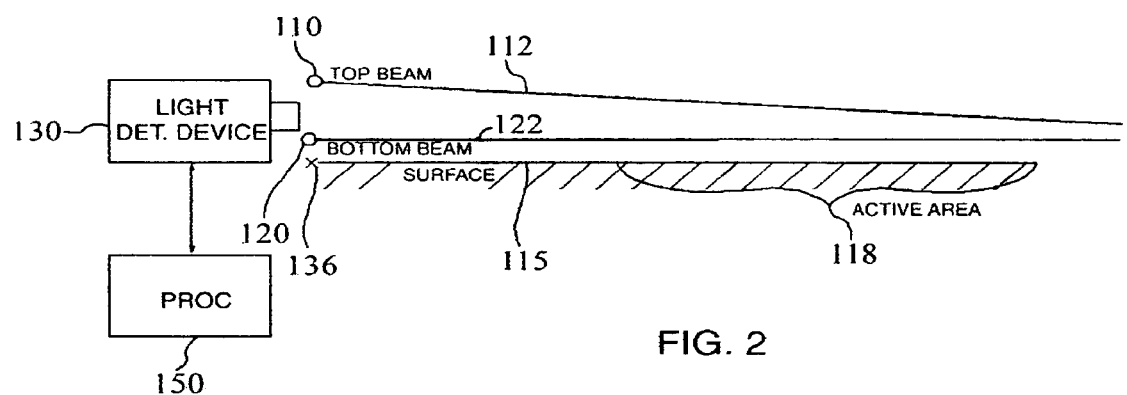
FIG. 2 describes a system that uses multiple light sources to determine a depth of an object placed onto a monitored region.

FIG. 2 describes a system that uses multiple light sources to determine a depth of an object placed onto a monitored region. A system includes a first light source 110 that produces a first light beam 112, and a second light source 120 that produces a second light beam 122. The first light beam 112 and the second light beam 122 are directed over a surface 115. A light-detecting device 130, such as a specially-configured camera, is placed to view a region extending over active area 118 of surface 115. The light detecting device 130 is configured to capture light reflecting or otherwise formed off of an object that intersects light beams projected over the active area 118. A processor 150 is coupled to the light-detecting device 130 to process information captured by the light-detecting device.

The first light source 110 and second light source 120 may fan across an area that includes the active region 118. The first light source 110 and the second light source 120 are directed so that the first light beam 112 and the second light beam 122 do not intersect at any point prior to or in the region of the active area 118. In one embodiment, the first light beam 112 and second light beam 122 are oriented to converge beyond the region of the active area 118. For example, active area 118 may have a maximum distance of 20 centimeters from first and second light sources 110, 120, while the first light beam 112 and the second beam 122 have a convergent angle of about 3 degrees or less. With this angle, the convergence of the light beams 112, 122 occurs well past the active area 118. In another embodiment, first light beam 112 and second light beam 122 are parallel to one another.

Detectable light patterns are formed on an object that intersects the first light beam 112 and second light beam 122. One light pattern may be formed on the object for each light beam. The light-detecting device 130 detects and captures the light patterns formed by the first light beam 112 and second light beam 122. In one embodiment, the light-detecting device 130 includes light-sensitive pixels to capture the image of the light patterns. Each pixel records light reflected from one small portion where light is reflected on the object. In an embodiment, light-detecting device 130 is configured so as to measure a geometric characteristic of the image of each light pattern, where the geometric characteristic is dependent on the distance of the object from the light detecting device 130.

The processor 150 is coupled to the light-detecting device 130 to identify and process the measured characteristic of the image of the light pattern. The processor 150 uses the measured characteristic to determine a range that separates the placement of the object and a reference point 136 between light-detecting device and the object. A spatial relationship between the reference point 136 and the first light source 110 and second light source 120 may be known or determinable.

In one embodiment, processor 150 measures the distance between separate light patterns formed by the object intersecting the first light beam 112 and second light beam 122. Other computing resources, such as memory, may also be used to make the determination.

Figure 3:
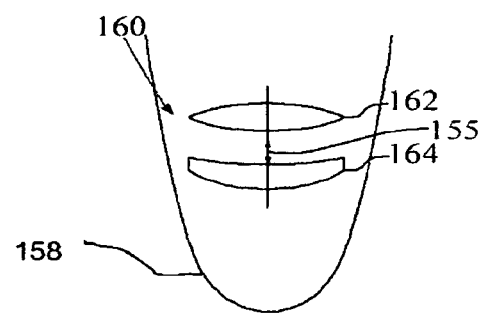
FIG. 3 illustrates a light pattern created by light sources such as described in FIG. 2, for use in determining the depth of the object.

FIG. 3 illustrates a light pattern 160 that is formed when an object 158 is positioned over or on active area 118 so as to intersect first light beam 112 and second beam 122. A first portion 162 of light pattern 160 is formed by first light beam 112 being intersected by the object as the object is placed on or over the active region 118. A second portion 164 of light pattern 160 is formed by second beam 122 being intersected by the object as the object is placed on or over the active region 118. The light-detecting device 130 may detect and store images of the first portion 162 and second portion 164. A gap distance 155 separates the first portion 162 from the second portion 164. The gap distance 155 is an example of a geometric characteristic that can be used to determine the depth of the object 158 relative to the light detecting device 130. In FIG. 2, the depth is in the direction of the first light beam 112 and the second light beam 122. The object 158 may, for example, correspond to a stylus or finger.

One principle that can be utilized to determine the depth of the object's placement onto the monitored region is that the object will appear smaller to an observation point the further the object is from that point. As a result, an image of gap distance 155 between the first portion 162 and second portion 164, as captured by light-detecting device 130, will vary depending on the proximity of the object 158 from the light-detecting device. Specifically, a value determined from an image of the gap distance 155 become greater when the object 158 is closer to light detecting device 130 when it intersects the first light beam 112 and second light beam 122. Likewise, the value determined from gap distance 155 becomes smaller the farther the object 158 is from the light detecting device 130 when the object intersects the first beam 112 and second beam 122. In this way, gap distance 155 is a characteristic that, when imaged, can be used to approximate the depth of the object relative to where the image of the object is captured.

In FIG. 3, the gap distance 155 is shown between the approximate peaks of the first portion 162 and second portion 164 of light pattern 160. Other comparable gap distances between other regions of the respective first portion 162 and second portion 164 may also be used. For example, the gap distance 155 may be an average measured between several points on each of the first portion 162 and second portion 164. Additional description on how the light pattern 160 may be captured to determine values for the image of the gap distance 155 is provided in Section C.

Several techniques may be employed to detect light patterns and to measure distances between two light patterns. Examples of such techniques are described in Section C. Some considerations that are accounted for include determining the boundaries and/or brightness of discrete points recorded from each portion of the light pattern from which the gap distance 155 can be determined. For purpose of description above and elsewhere in this section, the first portion 162 and second portion 164 are assumed detected, and the gap distance 155 is assumed to be the vertical distance between the peaks of each of the portions of the light patterns.

The gap distance 155 may be correlated to an approximate depth from where the object intersects first light beam 112 and second light beam 122 using various techniques. In one embodiment, a table or other relational data structure is used to correlate specific values of the image of gap distance 155 to an approximate depth-wise distance of the object from light detecting device 130. Once the image of the gap distance 155 is made and measured, the measured amount may be correlated to the approximated distance using the table.

In another embodiment, the angle between convergent light beams and the value of the measured gap distance 155 may be used to determine the distance between the object and the light detecting device. Such a measurement may be made on-the-fly, so that no predetermined values need to be calculated.

Figure 4:
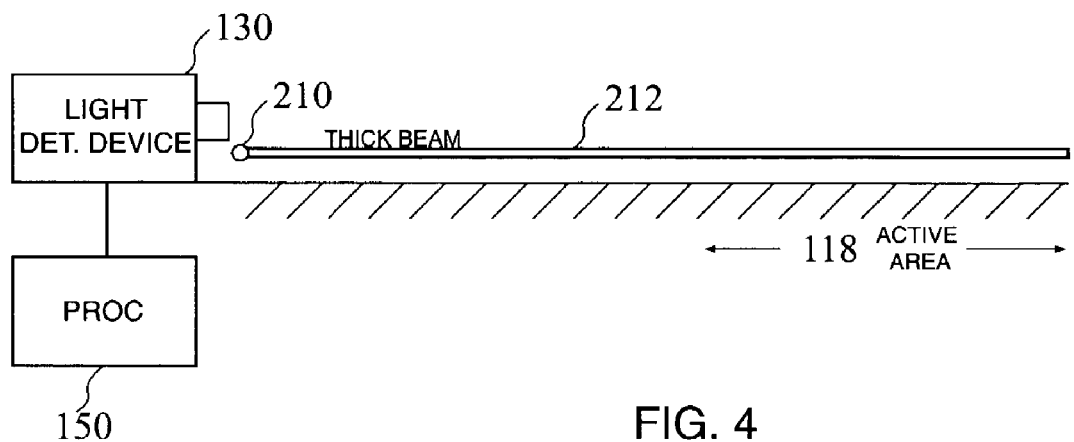
FIG. 4 describes a system that uses a single light source to determine a depth of an object placed onto the monitored region.

FIG. 4 describes a system that uses a single light source to determine a depth of an object placed onto a monitored region. The light-detecting device 130 cooperates with a light source 210 that provides a single light beam 212 over active region 118. In one embodiment, single light beam 212 is thicker than either of the first light beam 112 and second light beam 122 produced by separate light sources, as described with FIG. 2. The light beam 212 may be fanned over active region 118 to produce an image. The processor 150 is coupled to light detecting device 130 to identify the image of the light pattern (FIG. 5) formed by the object intersecting the light beam 212. The processor 150 approximates the depth-wise distance between the object and light detecting device 130 by measuring a dimension of the image of the light pattern 262 (FIG. 5).

Figure 5:
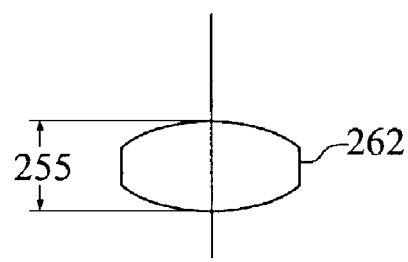
FIG. 5 illustrates a light pattern created by a light source such as described in FIG. 4, for use in determining the depth of the object placed onto the monitored region.

FIG. 5 illustrates light pattern 262 reflected by the object intersecting the single light beam 212. An image of the light pattern 262 may be used to approximate the distance of the object from the light detecting device 130 when the object intersects the light beam 212. The image of the light pattern 262 will become smaller as the light pattern is moved further away from light-detecting device 130. Accordingly, one or more dimensions of the image of light pattern 262 may be used to approximate the distance between the object and the light-detecting device 130 as the object intersects the light beam 212. In one embodiment, a height 255 of the image of the light pattern, as measured in the direction of gravity, may be used to approximate the depth-wise distance between the object and the light detecting device 130. The height 255 will become less the further the object is from light detecting device 130, and more the closer the object is to light detecting device 212.

Similar to embodiments described with FIG. 3, one embodiment provides that a table correlates a value of the height 255 with the depth-wise distance between the object and the light detecting device 130. Thus, when an image of light pattern 262 is captured, height 255 of the image may be determined and matched to a predetermined approximation of the depth-wise distance between the object and light detecting device 130.

Figure 6:
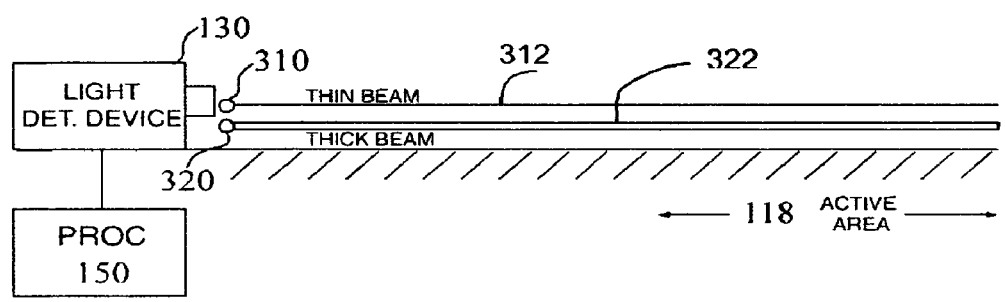
FIG. 6 describes a system for determining a depth of an object's placement onto the monitored region using multiple light sources, where one light source is thicker than another, under an embodiment of the invention.

FIG. 6 describes a system for determining a depth of an object's placement onto the monitored region using multiple light sources, where one light source produces a beam that is thicker than a beam produced by the other light source. In an embodiment, a first light source 310 produces a relatively thin beam 312, and a second light source 320 produces a relatively thick beam 322. The light detecting device 130 captures an image of a light pattern formed by thin beam 312 and thick beam 322 reflecting off of the object when the object intersects the two beams. The processor 150 may be used to approximate the distance between an object that intersects the light beams 312 and 322.

Figure 7:
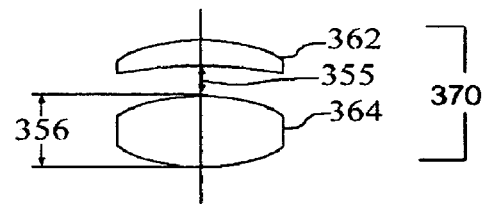
FIG. 7 illustrates light patterns created by light sources such as described in FIG. 6, for use in determining the depth of the object placed onto the monitored region.

FIG. 7 illustrates an overall light pattern 370 created by light sources such as described in FIG. 6, for use in determining a depth of an object's placement. The light pattern 370 includes a first portion 362 formed by the object intersecting the thin beam 312, and a second portion 364 formed by the object intersecting the thick beam 322. A gap distance 355 corresponds to a distance between an amplitude of the first portion 362 and second portion 364. In addition, a height 356 of the second portion 364 formed by the thick beam 322 may be determinable.

According to an embodiment shown by FIG. 7, an image of the first portion 362 and second portion 364 may be used to approximate the depth from where the object intersects the beams relative to light detecting device 130. The gap distance 355 may be used in a manner described with FIG. 3. The height 356 may be used in a manner described with FIG. 5. In one embodiment, each of the distances approximated by the gap distance 355 and the height 356 may be independently determined. The values may be averaged, or otherwise combined, to better approximate the distance between the object intersecting the light beams and the light detecting device 130. In another embodiment, the second portion 364 may be used to determine whether the object made contact with active region 118, while the gap distance 355 is used to determine the depth-wise distance of the object from light detecting device 130.

D. Imaging of Light Patterns used for Determining Depth

In order to use light patterns created by one or more light beams reflecting off of an object to determine the depth of where the object intersected the light beams, the light pattern formed by the reflections needs to be properly imaged. In addition, the geometric characteristic of the light pattern must be measured. This section describes techniques by which pertinent light patterns may be detected and properly imaged so that selected geometric aspects of the light patterns can accurately approximate the depth of the objects placement across light beams being directed over the monitored region. Reference to numerals of FIG. 2 is intended to illustrate exemplary components for practicing embodiments of the invention.

The light detecting device 130 and processor 150 may cooperate together to identify light patterns formed by light beams reflecting off an object. The boundaries of a light pattern, or blob, formed by the reflection of one beam (or other structured light portion) off of the object, are identified. In embodiments where multiple light sources are used, a common reference point for the blob formed by the object intersecting the light beam also needs to be identified.

To determine the boundaries of a light pattern or blob, values recorded by light-sensing pixels of light detecting device 130 may be compared against a threshold value. If a pixel has a value that is greater than the selected threshold, then the pixel is assumed to be "on"—that is to have recorded light reflecting from a portion of the object. A cluster of pixels that are "on" define the boundaries of the light pattern.

In an embodiment, the threshold value may be determined by detecting the brightest pixel in a set of pixels. A percentage of the value of that pixel may be used to set the threshold. This permits similar techniques to apply to dark and light objects equally. For example, the threshold value for a black stylus will be much less than the threshold value for a finger nail, but the light reflected off of each of the respective surfaces may be identified as forming equivalent light patterns because the same percentage of the maximum pixel value is used to determine which pixels are "on" for both the stylus and the finger nail.

Figure 8:
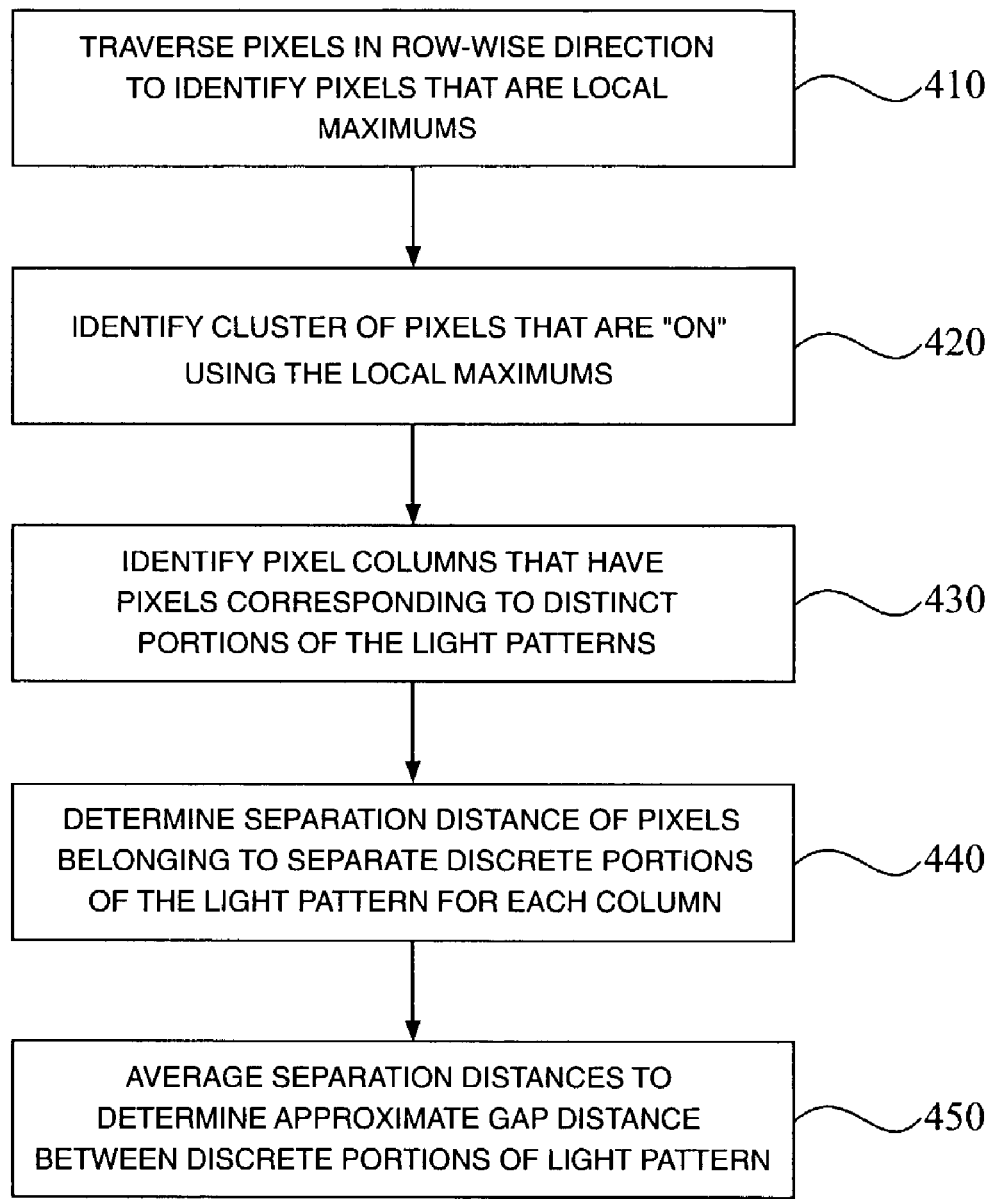
FIG. 8 illustrates a method for determining a gap distance between distinct portions of a light pattern formed by an object intersecting multiple light beams.

FIG. 8 illustrates a method for determining a gap distance between distinct portions of a light pattern formed by an object intersecting multiple light beams, under an embodiment of the invention.

In step 410, pixels are traversed in a row-wise direction to identify pixels having a maximum value. One or more pixels in sets of rows having pixel values that are the greatest are designated as the local maximum pixels.

In step 420, clusters of pixels that are "on" are identified from the local maximum pixels. These pixels may correspond to pixels which surround the local maximum pixels and which have pixel values that are greater than a set percentage of the local maximum pixel values.

In step 430, columns of pixels are identified that have pixels corresponding to individual blobs or distinct portions of light patterns formed by each light beam reflecting off the object. A column may have pixels from two blobs or distinct portions of the light pattern if there is at least one "on" pixel that is separated from another "on" pixel by one or more pixels that are "off". If one column contains pixels from two blobs or distinct portions of the light pattern, then the column is marked.

In step 440, a separation distance that separates pixels of two blobs is calculated for each column that contains pixels from the two blobs.

Step 450 provides that the separation distances calculated for each of the columns are averaged to approximate the distance between the image of the two light patterns formed by the object intersecting the light beams. The average separation distances may correspond to the gap distance 155 in FIG. 3, and the gap distance 355 in FIG. 7.

Other techniques may be employed to determine the gap distances. For example, another embodiment provides that a center line of a cluster of pixels, determined to be recording light reflected from the object, may be assumed to be the maximum pixel for the distinct portion of the light pattern formed by the object intersecting one light beam. The measurement for the image of the gap distance may correspond to the separation distance between clusters of pixels along the centerline.

E. Depth-Wise Distance Calculations

The object-distance calculations are identical for the types of apparatus described in FIGS. 2, 4 and 6. The object-distance calculations involve consideration of the distance between two planes, as measured in the image. With two beams, the two planes are the planes of maximum intensity through each beam. With one beam, the two planes are the top and bottom boundaries of the beam.

In the single-beam case, it is necessary to define the notion of "beam boundary." The brightness profile in a vertical cross section through the beam is a function that depends on the optics that generates the beam. Very often this profile is at least approximately a Gaussian function. The "boundaries" can then be defined as the inflection points of the intensity profile or, equivalently, as the points formed by the intersection of the Gaussian function with a threshold placed at half the peak value of the Gaussian. Similar definitions can be given with beams that do not have a Gaussian profile.

The term separation may be used to denote the distance between the two planes in question, so that "separation" now refers to either beam separation, for a two-beam method, or beam thickness, for a single-beam method.

Let $\tau(d)$ be the separation at a distance d from the light source, and let $\tau_S$ and $\tau_F$ be the values of separation at the source (S) and at some far point (F) beyond the active area, and at distance $d_F$.

Then, separation is given by the expression $$\tau(d) = \tau_S - kd \qquad (1)$$

where $$k = \frac{\tau_S - \tau_F}{d_F}.$$

The separation l(d) measured in the image decreases with distance d because of the decreasing separation $\tau(d)$, and because of the apparent reduction in size with distance that is typical of perspective projection. A system can be defined with its origin at the center of projection of the camera, and its y axis pointing along the camera's optical axis.

Furthermore, let $(x_b, y_b)$ be the coordinates of the beam generation source, projected onto the planar surface, in this system of reference. The law of perspective projection yields the following expression for image separation:

$$l(d) = \frac{\tau(d)f}{d} \quad (2)$$

where f is the focal distance of the lens.

Combining equations (1) and (2) and solving for d yields the desired expression for object distance as a function of measured image separation l(d):

$$d = \frac{\tau_S f}{l(d) + kf}. \quad (3)$$

If the obstructing object is at coordinates (x, y), its distance d from the beam source along the y axis is $$d = y - y_b, \quad (4)$$

assuming that beams and camera point in the same direction along the y axis. The x coordinate of the object on the plane can be computed from its distance d and from the horizontal position (image column) c of the vertical image line along which the image separation l(d) is measured. If $c_o$ is the horizontal position of the image center, then the equation of perspective projection yields $$x = \frac{d}{f}(c - c_0). \quad (5)$$

Equation (4) gives the y coordinate:

$$y = d + y_b. \quad (6)$$

According to embodiments described above, structured light reflecting off of the object intersecting the structured light at a skewed angle will be identified similar to objects that are orthonormal when intersecting the structured light. As such, embodiments of the invention do not differentiate between objects that are fingers and styluses, or fingers that have different fingernail shapes which intersect the structured light.

F. Using Depth Information to Determine Virtual Input

Figure 9:
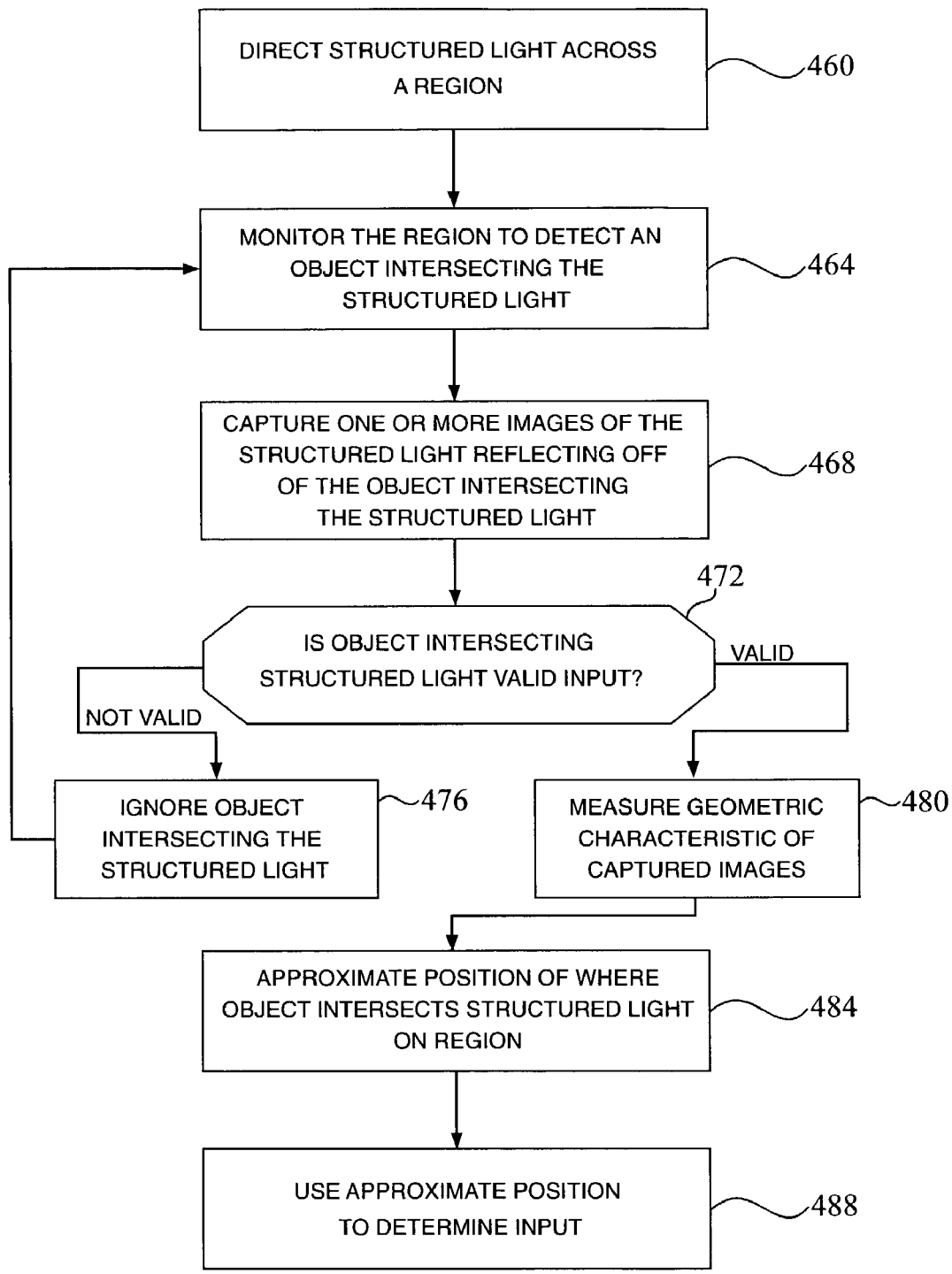
FIG. 9 describes a method for detecting depth information as virtual input for an electronic device.

FIG. 9 describes a method for detecting depth information as virtual input for an electronic device. A method such as described with FIG. 8 may be used to detect and interpret movements or placements of the object into virtually detected input for an electronic device. For example, the electronic device may be equipped to project a virtual keyboard or pad. Input that can be detected may correspond to the selection of a key from the keypad, or the trace movement of a pointer across the pad.

Step 460 provides that structured light is directed across a region. In one embodiment, the monitored region may correspond to a surface or plane where a virtual input device is displayed or otherwise provided. A projector may be equipped to provide an image of a virtual input device that guides or otherwise indicates input values to the user for directing placement of the object. An example of such a virtual device is a keypad that is projected by light. In another embodiment, the monitored area corresponds to an area where the movement of an object may be traced.

In step 464, the region is monitored to detect an object intersecting the structured light. In embodiments where the structured light corresponds to two or more light beams, the object is detected when it intersects both the first beam and the second beam. In an embodiment where the structured light is a single beam, the object is detected when it intersects only the single beam.

In step 468, one or more images are captured of the structured light reflecting off of the object as the object is placed onto the monitored region. In one embodiment, a series of images are captured in short succession. Embodiments provide that a sequence of two or more images are captured of the object intersecting the structured light over a time frame in order to determine whether the object made contact with the surface underlying the monitored region.

In step 472, a determination is made as to whether the object intersecting the structured light is to be identified as valid input for the electronic device. For example, in an embodiment where the virtual input is the selection of a key from a projected keyboard, the selection of the key may correspond to when a user makes contact with a surface where the selected key is being displayed. Since a gap may exist between where the structured light is directed over the monitored region and the surface or plane that is to correspond to the monitored region, it is possible for an object to intersect the structured light but not make contact or intersect the plane of the monitored region. Accordingly, an embodiment provides that the object intersecting the structured light is detected as valid input only if it also makes contact with the surface underlying the monitored region. Thus, when a virtual keyboard is displayed on the monitored region, a user's finger has to also contact the surface where the keyboard is being displayed in order for the finger to have been detected as selecting a key.

Figure 12:
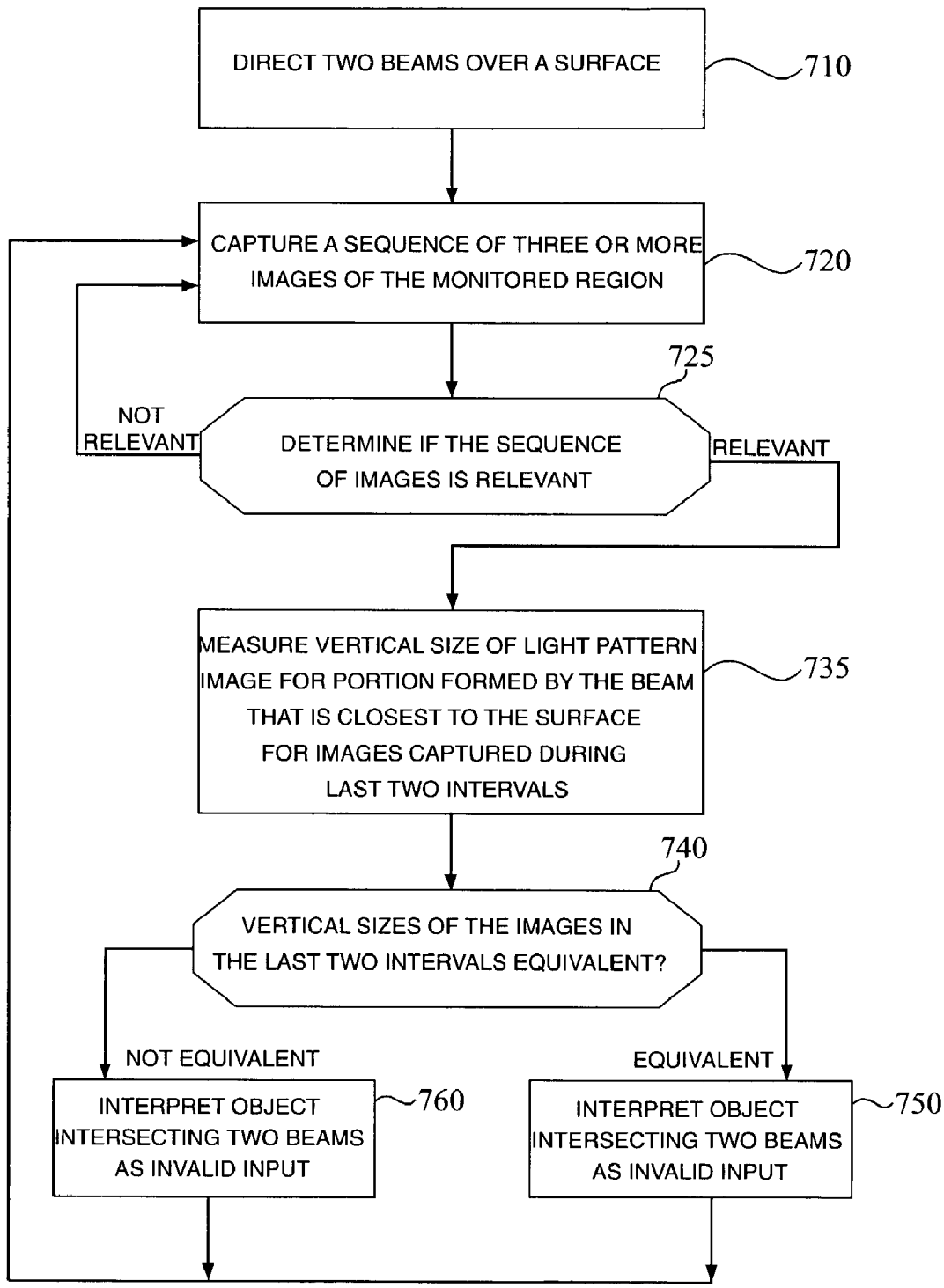
FIG. 12 illustrates a method for determining when virtual input entered into an electronic device is valid.

Several techniques may be used to determine whether the object intersecting the structured light should be interpreted as input. FIG. 12 describes a method where the captured image of the reflection of the directed light off the object is used to determine whether the object intersecting the directed light is input or not. Other techniques exist as well. A patent application entitled "A Method And Apparatus For Approximating A Source Position Of A Sound-Causing Event For Determining An Input Used In Operations Of An Electronic Device," having Ser. No. 10/115,357, and filed Apr. 2, 2002 (the aforementioned application being hereby incorporated by reference for all purposes) describes a technique that can be used to employ sound emitting from the object contacting a surface of the monitored region as an identifier for when the object intersecting the structured light is to be detected as input. Thus, the combination of sound and imaging may be used to determine whether the object intersecting the structured light is valid input.

If the determination in step 472 is that the object intersecting the structured light is not valid, then step 476 provides that the object intersecting the structured light is ignored. The method returns to step 464.

If the determination in step 472 is that the object intersecting the structured light is valid, then step 480 provides that the geometric characteristic used for determining the depth is measured from the captured images of the object intersecting the structured light. In an embodiment described with FIG. 2 and FIG. 3, the measured characteristic is the gap distance between distinct portions of the image of the overall light pattern. In an embodiment such as described by FIG. 4 and FIG. 5, the geometric characteristic is a height of image of the light pattern.

Step 484 provides that the measured geometric characteristic is used to approximate a position of where the object intersects the structured light on the monitored region. The approximated position may include a coordinate that is based on a depth-wise distance between where the object intersects the structured and where the image of the light patterns are captured by the light detecting device. In an embodiment, another coordinate of the position of the object intersecting the structured light may be determined using various other techniques. Other coordinates may correspond to the position of the object's intersection referenced on an axis that is orthonormal and coplanar with the monitored region. For example, the location of the object intersecting the structured light relative to a centerline may be determined by measuring an angle between where the object intersects the structured light and the optical axis of the light detecting device. Once the angle and the depth are known, other coordinates, such as the position of the object along another axis that is coplanar to the monitored region, may be determined.

In step 488, the approximated position of the object intersecting the structured light is used to determine an input value or function. In one embodiment, different input values and functions may be assigned to individual positions identified by coordinates or ranges of coordinates. The coordinate identified in step 488 may be correlated to predetermined input values.

Figure 10:
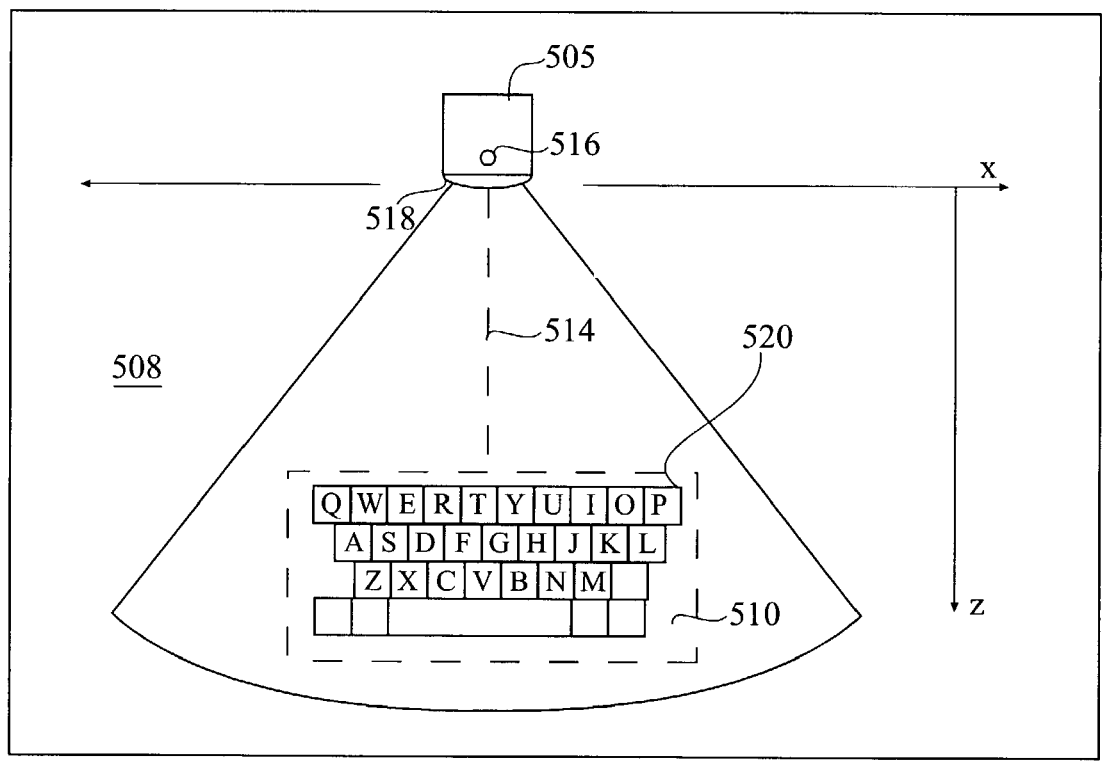
FIG. 10 is a top view of an electronic device that projects a virtual keyboard, under an embodiment of the invention.

FIG. 10 is a top view of an electronic device that projects a virtual keyboard, under an embodiment of the invention. An electronic device 505 includes a projector 518 for displaying a virtual keyboard 520 over a monitored region 510. The electronic device includes an input detection mechanism 516 for determining virtually entered input.

The electronic device 505 may be placed on or near surface 508. An example of surface 508 may be a tabletop. The surface 508 may be referenced by an axis X and an axis Z, which define a plane of the surface 508. Electronic device 505 includes devices with processing and memory resources. In one embodiment, electronic device 505 corresponds to a portable or small form factor device, such as a personal digital assistant (PDA), cellular phone, or laptop computer.

The projector 518 may use visible red-green-blue light to project various images, including the image of keyboard 520. An example of a projector or method of projecting is provided Application No. PCT/US02/20248, entitled "Method And System To Display A Virtual Input Device," the aforementioned application being hereby incorporated by reference for all purposes. The keyboard 520 may be projected on or close to a surface, such as a table top. The keyboard 520 may comprise alphanumeric keys. The particular key design shown in FIG. 10 is a QWERTY style keyboard. While an embodiment shown by FIG. 10 describes keyboard 520 as being virtual, other embodiments may use concrete images to provide the input device. For example, keyboard 520 may be an illustration or fixed image that appears on surface 508.

The input detection mechanism 516 detects the object making contact with surface 508 over the monitored region 510. The input detection mechanism 516 includes components such as described in FIG. 2, FIG. 4 and FIG. 6, that detect placement of an object along the axis Z of surface 508. Embodiments also provide for the input detection mechanism 516 to be configured to detect placement of the object along the axis X. A processor and other computing resources of electronic device 505 may be coupled to the input detection device 516 in order to determine the position of an object placed over the monitored region 510.

According to an embodiment, a user may direct an object onto the monitored region 510 to select keys from the virtual keyboard 520. The input detection mechanism 516 includes one or more light sources that direct structured light across the monitored region 510 in conjunction with projector 518 displaying the keyboard 520. The structured light may be directed just above surface 508. The input detection mechanism 516 may also include a light detecting device that captures the image of light reflecting off of a user-controlled object when the object intersects the structured light. A processor may inspect the captured image to determine what input, if any, should be determined from the object intersecting the structured light.

In one embodiment, a user selects one or more keys from the keyboard 520 by directing an object onto the surface 508 at a region where an image of that key is being displayed. When the object intersects the structured light to make contact with surface 508, the object intersecting the structured light is interpreted as valid virtual input. If the object intersecting the structured light is to be detected as input, then a geometric characteristic of the captured images of the structured light reflecting off of the object is utilized to determine the position of the object along axis Z. The position of the object relative to a centerline 514 or other reference point may be used to determine the objects position relative to the axis X. In this way, the processor may detect the particular key selected by the user by determining the object's position along the axes Z and X.

Because a device operating under an embodiment of the invention may detect both depth of an object's placement and the fact that the object made contact with an underlying surface, it is readily possible for embodiments of the invention to permit the user to select multiple keys at one time. For example, one image may capture two or more light patterns, where each light pattern corresponds to light reflecting off one of the user's fingers. Each light pattern may be separately analyzed to determine the key selected by that finger intersecting the structured light. An object intersecting the structured light and contacting surface 508 in a region other than where keyboard 520 is being displayed may be ignored, recognized as no-input, or treated as invalid input.

Figure 11:
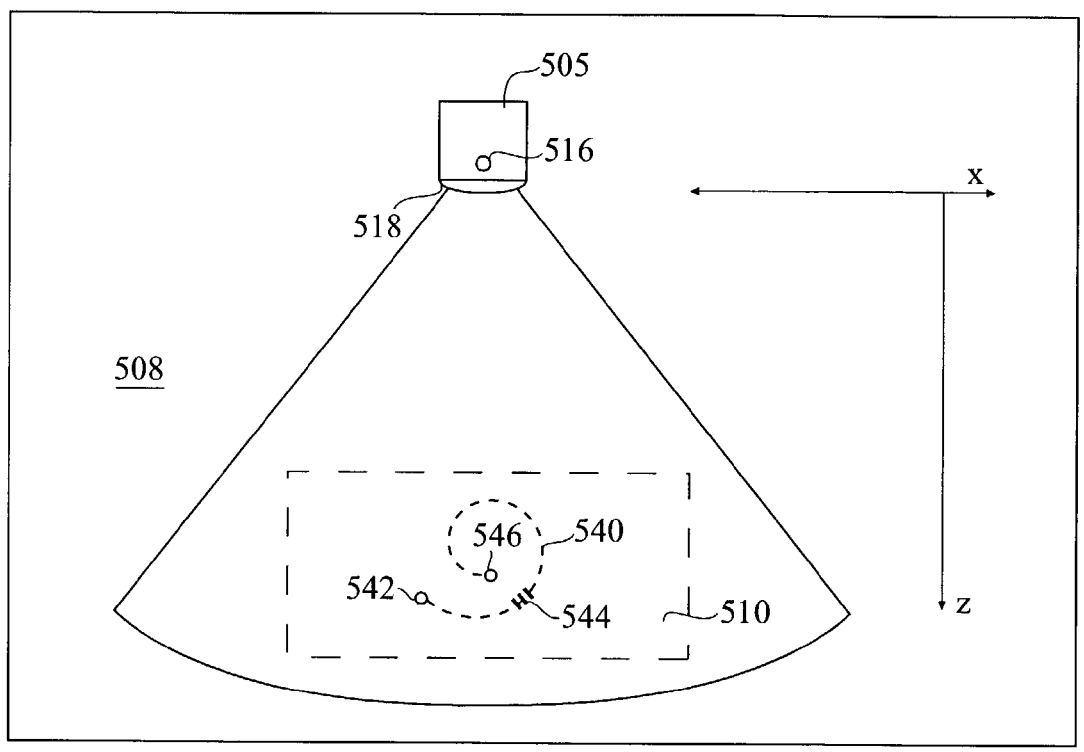
FIG. 11 is a top view of an electronic device that projects a virtual area for entering input with a pointer, under an embodiment of the invention.

FIG. 11 is a top view of an electronic device that projects a virtual area for entering input with a pointer, under an embodiment of the invention. An embodiment such as described with FIG. 11 may be operated as an alternative mode to a mode that provides virtual keyboard 520 (FIG. 10). For example, the user may select to switch from a keyboard mode to a pointer mode to enter a pointer input into electronic device 505. The pointer input may, for example, simulate an electronic mouse. When in the pointer mode, the electronic device 505 may display monitored region 510 as a polygon with boundaries that inform the user where input will be interpreted as being valid.

The user may direct a finger or other object onto surface 508 and trace a gesture 540 in the monitored region 510. The gesture 540 may be referenced by a starting point 542 and an ending point 546. One or more images of the object intersecting the structured light to contact surface 508 at the starting point 542 are captured. When the object contacts surface 508 at starting point 542, the contact is identified as valid input. Successive images are captured of the object as it is traced over the monitored region 510 to form gesture 540. Between the starting point 542 and the ending point 546, successive images are captured of the object at a plurality of intermediate positions 544. The granularity of the intermediate positions 544 depends on the speed at which images are captured by input detection mechanism 516.

For each image of the light pattern formed by the object intersecting the structured light and contacting surface 508, a geometric characteristic of the light pattern is measured. The measured characteristic is used to determine a coordinate of the object at different points on gesture 540, including at the starting point 542 and the ending point 546. The coordinate of each position of the object may be determined by approximating the position of the object along the axes X and Z.

The input corresponding to gesture 540 may be one of several. In one application, only the end point 546 counts as input. For example, the position of a cursor on a display (not shown) of electronic device 505 may be moved by positioning the object at end point 546. In another application, the difference between a value associated with the start point 542 and the end point 546 is measured to identify the input value. Still, another application provides for gesture 540 to be redrawn on a display. For example, a digital sketch may be formed by the object being traced over the monitored region 510. The gesture 540 may be reproduced by extrapolating and interconnecting the points identified on the object's gesture. Still further, gesture 540 may track or point a corresponding pointer on a display to a particular display region, in the manner an electronic mouse or computer pointer is operated.

G. Detecting Valid Virtual Input

FIG. 12 illustrates a more detailed method for determining when virtual input entered into an electronic device, such as described in FIG. 10 and FIG. 11, is valid. A method such as described with FIG. 12 may be used in combination with a method described in FIG. 9 to make the determination in step 540. If a user intends to enter input, the image or representation may signify to the user that entry onto the monitored region is valid only if the directed object (i.e. finger or stylus) contacts the surface underlying the monitored region. For example, in embodiments such as described by FIGS. 10–11, a user may be provided with an image or representation of a keyboard or set of keys, or alternatively may be provided with a surface to enter gestures as input. In such embodiments, the use of input detecting device 516 requires electronic device 505 to distinguish between when the object makes contact with surface 508 over monitored region 510, and when the object intersects the structured light without making contact with that surface.

An embodiment such as described in FIG. 12 may be implemented on an input detecting device that produces two or more distinct beams. An example of such an embodiment is described in FIGS. 2 and 3.

Step 710 provides that two or more beams are directed over a surface corresponding to a monitored region, with the bottom of the lower beam grazing the surface. In one embodiment, the bottom beam produced by the light detecting device is about 3 mm above the surface underlying the monitored region.

In step 720, a sequence of three or more images is captured of the monitored region. Each of the images in the sequence is captured successively at distinct time intervals. The light detecting device 130 (see FIG. 2) is configured so that when an object intersects the beams, the light reflecting off of the object is captured at each of the intervals in the sequence. A suitable time period between when images in the sequence are captured is about ⅟₆₀ seconds.

In step 725, a determination is made as to whether the sequence of images captured in step 720 is relevant. In one embodiment, a sequence of images captured at the distinct time intervals is relevant if the first image in the sequence does not indicate the object has intersected any of the beams, and if the last two images indicate that the object intersected the beams during the last two intervals. If the determination in step 725 is negative, then the method is repeated at step 720.

If the determination in step 725 is positive, then step 735 provides that, at each of the last two intervals, a vertical size is measured for the image of the distinct portion of the light pattern formed by the object intersecting the beam that is closest to the surface underlying the monitored region. The vertical size of the portion of the light pattern for the bottom beam increases the closer the object is to the surface, until the maximum vertical size is reached when the object contacts the surface.

In step 740, a comparison is made of the measured vertical sizes formed at each of the last two intervals to determine if the vertical sizes are equivalent. If the measured vertical sizes are the same, then the object can be assumed to be in about the same position between the second and third time intervals. Else, the object may be assumed to have moved between the second and third time intervals.

If the vertical sizes being compared in the last two intervals are the same, then step 750 provides that the object intersecting the two beams is interpreted as valid input. This conclusion may be drawn because the object had to have descended rapidly to intersect the beams since the first image in the sequence shows no object in the first interval. But between the second and third intervals, the object had zero velocity, since its position did not change as compared to the second interval. The position of the object may then be determined, such as in a manner described with other embodiments.

If the vertical size being compared in the last two intervals is different, then step 760 provides that the object intersecting the two beams is interpreted as not being valid. An example of this may be when a descending user's finger is jerked up before making contact with the surface underlying the monitored region.

In summary, the image sequence approach described in FIG. 12 draws the inference that an object intersecting the two beams is valid input because the object intersects the light beams at a high speed, and then suddenly comes to a stop. User-controlled objects such as a fingers or stylus, may intersect the beams at, for example, a speed of 300–400 mm/second when contacting the surface of the monitored region to enter input. At such speeds, the possibility that the user would reverse the direction of the finger and jerk it up is small. This possibility is further reduced by maintaining the lower beam at a grazing height over the surface underlying the monitored region.

While an embodiment such as described with FIG. 12 uses the vertical size of the image for the light pattern formed by the object intersecting the bottom beam, other embodiments may use other characteristics of the light patterns formed on the images. For example, in one embodiment, the overall size of the light pattern may be used instead of the vertical height of the portion of the light pattern formed by the bottom beam.

Several refinements may be made to the approach described in FIG. 12. It is possible to set threshold comparison values when comparing the vertical sizes of the portions of the light patterns appearing on the captured images of the last two intervals. For example, if the vertical size of the last image in the sequence is determined to be 90% of the vertical size of the second to last image, the conclusion may be drawn that the two vertical sizes are essentially the same, and that the object came to a stop in the last frame. The exact threshold level for determining the two vertical sizes as being the same may be determined through calibration or trial and error, on a case by case basis.

Another refinement to an approach such as described in FIG. 12 is to capture images of the light patterns repeatedly over a greater number of successive time frames. For example, the shape or vertical size of the overall light pattern, or portions of the light pattern formed by individual beams, may be required to remain essentially unchanged for more than two frames. This would increase the probability that the object intersecting the beams would correctly be identified as input.

It is also possible for an image to be captured just as an approaching object intersects the upper beam, but without yet having intersected the lower beam. In this scenario, a single portion of a light pattern would be visible in the second of four or more time frames. In such an embodiment, it may be beneficial to conclude a valid input has been entered when no image of a light pattern is formed in the first time interval, an image of a portion of a light pattern belonging to the upper beam is formed in the second time frame, and an image of portions of the light pattern belonging to the upper and lower beams is formed in the third and fourth time frames. The chances that an object intersecting the beams would correctly be determined as valid or invalid input would be enhanced with such an embodiment, although additional costs would be associated with using additional frames.

In addition, a single beam construction such as described in FIGS. 4 and 5 may be employed in other embodiments. The vertical height of the light pattern formed by the single beam may be substituted for the height of the portion of the light pattern formed by the bottom beam.

Several other techniques may be used to determine when the object intersecting the structured light of the input detection mechanism 516 (FIG. 10 and FIG. 11) should be interpreted as valid input. In one embodiment, during an initial calibration setup, an object is placed on the surface 508 (FIG. 10 and FIG. 11) at various identifiable positions of the monitored region. An image of the light pattern caused by the structured light reflecting off of the object is recorded at each of the positions. Subsequently, an image of the object intersecting the structured light at an identifiable position of the monitored region is compared to the image of the object recorded during calibration at that position. If the two images correlate sufficiently to one another, then the two images may be assumed to be equivalent. The input is then considered valid.

In an embodiment such as described, the characteristic of the image that is the basis for making the comparison is the vertical size of the object intersecting the beam that is most proximate to surface 508. In the event one beam is used, then the vertical size of that beam would be the basis for comparison. The two images that are compared may correlate to one another if their size (or other quantitative aspect) is within a threshold amount of one another. For example, an object intersecting two beams is considered valid input if the vertical size of an image of the portion of the light pattern for the lower beam is within 80% of the same image for the object contacting the surface of the monitored region at that same portion during the calibration step.

The particular technique used for determining whether the object intersecting the structured light is input depends on the application of the input detecting device 516. For example, an embodiment that uses calibration may be disrupted if surface 508 is partially overlaid with a piece of paper after the calibration step is performed, since the intersecting object would not be able to penetrate the lower beam. Consequently, the piece of paper may cause the object to be misinterpreted as invalid input. However, an embodiment that uses calibration may forego use of a high-speed light detecting device or camera.

H. Basic Mechanism to Detect Depth of an Object's Placement

Figure 13:
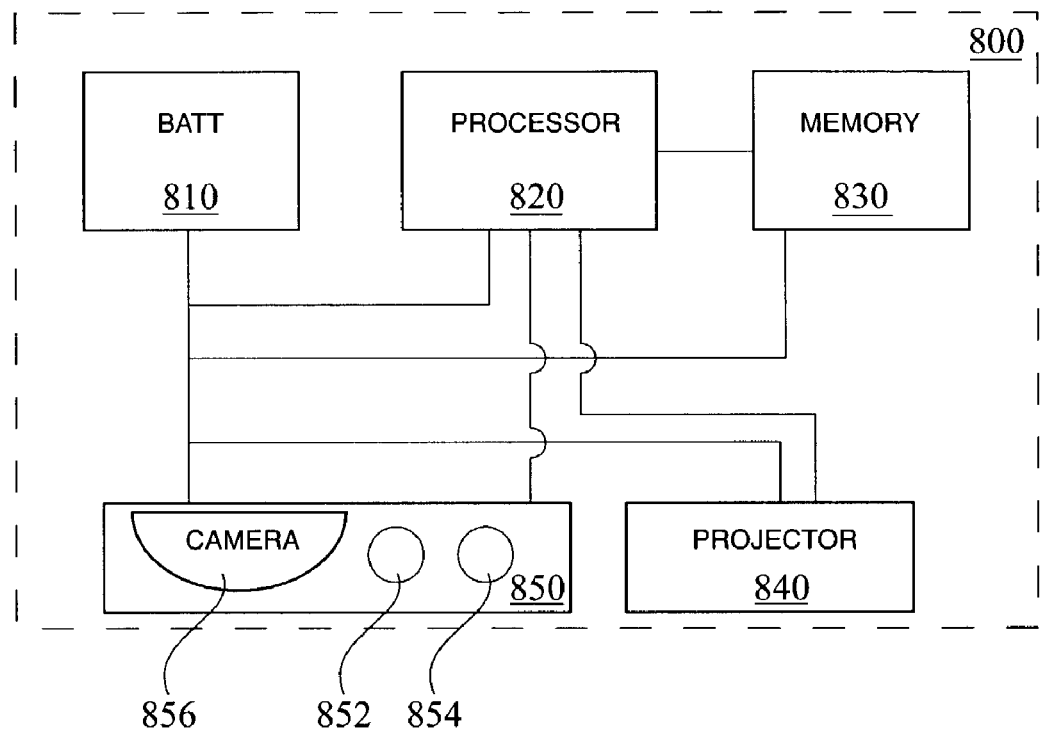
FIG. 13 illustrates basic components of a system to implement embodiments of the invention.

FIG. 13 illustrates basic components a system 800 to implement embodiments of the invention. The system 800 include includes a processor 820 coupled to a memory 830, a projector 840 and a detection mechanism 850. A battery 810 supplies power to the components of system 800.

In one embodiment, the detection mechanism 850 operates such as described with FIG. 2. The detection mechanism includes a first light source 852 and a second light source 854. The first light source 852 and second light source 854 are configured to produce two light beams that can be directed over a region that can be monitored. The detection mechanism 850 includes a camera 856 as its light detecting device. The camera 856 is placed so as to view an area onto which the beams are directed. The depth of the object's placement relative to camera 856 may be detected when the object intersects the light beams. As discussed with previous embodiments, light patterns formed by the beams of first light source 852 and second light source 854 reflecting off of the object may be imaged by camera 856 to detect the depth of the object's placement relative to the camera.

In one embodiment, camera 856 may be a CMOS device, having between 30 to 120 rows and 100 to 400 columns of light-sensitive pixels. The camera 856 may be positioned just above the surface 508 (FIG. 10 and FIG. 11), so as to have a shallow viewpoint. Due to the position of camera 856, it can be advantageous for the camera's pixels to be wider than they are tall. This allows for the vertical resolution of the captured images to be enhanced without having to increase the number of columns in the camera. A suitable size for individual pixel is 20 microns wide and 6 microns tall. The camera 856 may be operable at a frame rate of between 10 and 200 frames per second, and preferably at least as fast as 60 frames per second. Higher frame rates permit fast-moving objects to be adequately observed. Furthermore, higher frame rates facilitate detection and interpretation of repeated object movements into the monitored region. For example, the higher frame rate facilitates detection of several fingers moving in a typist-fashion on a virtual keyboard.

The beams produced by first light source 852 and second light source 854 are visible or infrared. A suitable wavelength for the beams is about 850 nanometers. This range of wavelength permits ambient light to be effectively filtered out by an infrared filter. The beams produced by first light source 852 and second light source 854 may be made to fan across the monitored region. The fan of the beam can be generated by an appropriate lens, such as the Powell lens used in the laser-beam products made by STOCKERYALE CANADA INC., of Quebec, Canada. Alternatively, the fan can be generated by shaping a laser beam or LED beam with an optical diffuser or diffractor that spreads light only in the horizontal direction. A fan-shaped beam can also be formed by reflecting a line beam into a mirror, which is then rotated or made to oscillate much faster than the camera frame rate, thereby effectively expanding the line into a fan.

In one embodiment, detection device 850 may be an integral component of an electronic device. In another embodiment, detection device 850 may be in the form of a module that is integratable with circuit boards or processors of different types of electronic devices. The projector 840 may also be integrated into the module containing the detection device 850. Examples of electronic devices that can incorporate or attach to module 800 include cell phones, PDAs, and lap-top computers. Other devices, such as workstations, machinery, and vehicles, may also include module 800. For example, detection device 850 may be provided as a circuit board component that can be mated with or connected to the processor or circuit board of the electronic device during manufacturing.

In another embodiment, detection device 850 may be part of a stand-alone unit that is manually attachable to one or more types of electronic devices. For example, detection device 850 may mate with processor 820 through a serial connector or other external port of the electronic device. As another example, detection device 850 may mate with processor 820 through a wireless connection.

I. Electronic Device Housing With Virtual Input Capabilities

Figure 14:
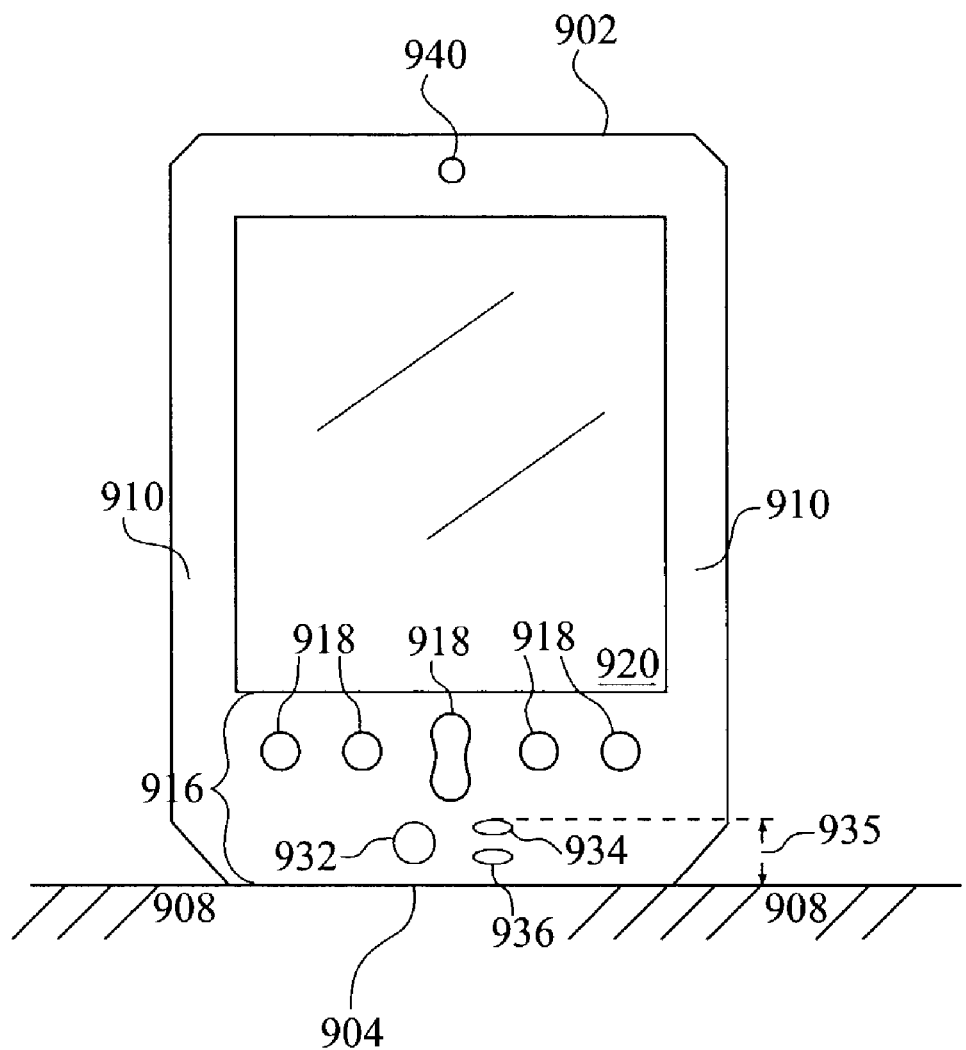
FIG. 14 is a front view of an electronic device that incorporates components for use in implementing an embodiment of the invention.

FIG. 14 is a front view of an electronic device that incorporates components for use in implementing an embodiment of the invention. The type of an electronic device 900 shown is a PDA, although other types of electronic devices may be used. The electronic device 900 includes a front panel 910 that provides a display 920. The front panel 910 may be referenced with respect to a top edge 902 and a bottom edge 904. A bottom portion 916 of front panel 910 extends between bottom edge 904 and display 920. The bottom portion 916 includes a plurality of buttons 918, or other actuatable features for enabling the user to enter input into the electronic device 900.

The bottom portion 916 of front panel 910 may be equipped with a camera 932, a first light source 934, and a second light source 936. The first light source 934 and second light source 936 combined to provide structured light. The camera 932 serves as the light detecting device. Operations of camera 932 and light sources 934 and 936 may be conducted in a manner that is similar to FIG. 2 or FIG. 6, or otherwise configured to implement embodiments described in this application. The first light source 932 and second light source 934 direct beams of light from front panel 910. In one embodiment, the beams are directed onto a surface 908, on which the bottom 904 of electronic device rests.

At a certain range of distance from front panel 910, camera 932 detects an object that intersects the beams of light produced by the first and second light sources 934 and 936. The camera 932 can capture the image of the light pattern formed on the object as that light pattern is reflected back towards the front panel 910. A processor (not shown) of the electronic device 900 may process the images of the light patterns to determine the distance of the object along the axis Z (out of the paper). This distance may be used to determine what input is to be associated with a position of the object intersecting the beams produced by the light sources 934 and 936.

Since a geometric characteristic of the image of the light pattern formed off of the object is used to determine the distance of the object from front panel 910, it is possible to arrange camera 932 to be adjacent to the light sources 934 and 936. This is in contrast to existing systems that require camera devices to be mounted above other sensor components for detecting position information about objects. A height 935 marks the distance between the first light source 934 and the bottom edge 904, where the first light source is more distal to the bottom edge than the second light source 936. Embodiments of the invention enable a lens of the camera 932 to be positioned at or below the height 935, relative to the bottom edge 904. Consequently, the size of bottom portion 916 may be minimized.

In comparison to a configuration where camera 932 is mounted above the light sources 934, 936, an embodiment such as shown by FIG. 14 may have smaller overall surface area. In addition, an overall height of the electronic device 900 may be reduced, as the camera 932 may be positioned laterally with respect to the first and second light sources 934 and 936. The height 935 may be just under three centimeters, indicating the first and second light sources are also less than three centimeters from surface 908. In one embodiment, first and second light source 934 and 936 are between one and two centimeters from the surface.

The camera 932 and light sources 934, 9436 may be used in combination with a projector 940 that provides a virtual interface or device (such as a keyboard) on the monitored region. The projector 940 may be mounted so as to project the virtual device onto the region being monitored by camera 932. One suitable position for projector 940 is between the display 920 and the top edge 902 of electronic device.

While FIG. 14 illustrates use of two light sources, other embodiments may utilize a single light source to produce a single beam. Such an embodiment may be structured in a manner described with FIG. 4.

J. Conclusion

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for determining depth of an object's placement onto a monitored region, the method comprising:

directing structured light across the monitored region, wherein the structured light is capable of creating a geometric characteristic when forming a light pattern on the object in the monitored region;

capturing an image of the light pattern that forms on the object as a result of the object intersecting the structured light when the object is placed at a first position in the monitored region;

identifying a geometric characteristic of the image of the light pattern, wherein the geometric characteristic of the image is variable with a depth of the first position relative to where the image is captured; and approximating the depth of the first position based on the geometric characteristic.

2. The method of claim 1, wherein directing structured light over the monitored region includes generating one or more beams that extend across and fan over the monitored region.

3. The method of claim 1, wherein directing structured light across the monitored region includes generating a first beam and a second beam to extend over the monitored region, wherein the first beam and the second beam are parallel to one another.

4. The method of claim 3, wherein generating a first beam and a second beam to extend over the monitored region includes generating the first beam to be proximate to a surface of the monitored region and to be thicker than the second beam.

5. The method of claim 1, wherein directing structured light over the monitored region includes generating a first beam and a second beam to extend over the monitored region, wherein the first beam and the second beam are directed to converge towards one another beyond the monitored region.

6. The method of claim 1, wherein capturing an image of a light pattern that forms on the object includes detecting reflected light using light-sensitive pixels.

7. The method of claim 1, wherein identifying a geometric characteristic of the image of the light pattern includes measuring a dimension of the image of the light pattern.

8. The method of claim 1, wherein:
directing structured light across includes directing at least a first beam and a second beam across the monitored object;
capturing an image of a light pattern that forms on the object includes capturing the image of a first portion of the light pattern and a second portion of the light pattern, the first portion of the light pattern being formed by the object intersecting the first beam, the second portion of the light pattern being formed by the object intersecting the second beam; and
identifying a geometric characteristic of the image of the light pattern includes measuring a gap distance between the first portion of the light pattern and the second portion of the light pattern.

9. The method of claim 8, wherein approximating the depth of the first position includes mapping the gap distance to one value from a set of values, wherein each value in the set of values corresponds to a range of the measured gap distance.

10. The method of claim 1, wherein:
directing structured light across the monitored region includes generating a single beam to extend over the monitored region;
capturing an image of a light pattern that forms on the object includes capturing a light pattern formed by the object intersecting the single beam; and
identifying a geometric characteristic of the image of the light pattern includes measuring a dimension of the light pattern formed by the single beam.

11. The method of claim 10, wherein identifying a geometric characteristic of the image of the light pattern includes measuring a height of the image of the light, wherein the height of the image of the light pattern is in a direction that is substantially orthonormal to a direction of the depth of the object's placement.

12. The method of claim 11, wherein approximating the distance based on the geometric characteristic includes mapping the height of the image of the light pattern to one value from a set of values, wherein each value in the set of values corresponds to a range of the measured height.

13. The method of claim 1, wherein the method further comprises:
determining that the object intersects the structured light and makes contact with a surface of the monitored region at the first position using the light pattern formed on the object intersecting the structured light.

14. The method of claim 1, wherein the method further comprises:
determining that the object intersects the structured light and makes contact with a surface of the monitored region at the first position using the geometric characteristic of the image of the light pattern formed on the object intersecting the structured light.

15. A method for using depth of an object's placement onto a monitored region as input, the method comprising:
directing structured light across the monitored region, wherein the structured light is capable of creating a geometric characteristic when forming a light pattern on the object in the monitored region;
capturing an image of a light pattern that forms on the object at a first position as a result of the object intersecting the structured light;
measuring one or more geometric characteristics of the image of the light pattern, wherein the one or more geometric characteristics of the image are variable with a depth of the first position relative to where the image is captured;
approximating the depth of the first position based on the measured geometric characteristic; and
determining an input corresponding at least partially to the depth of the first position.

16. The method of claim 15, further comprising determining at least two coordinates for the first position, wherein at least a first coordinate is determined from the determined depth of the first object.

17. The method of claim 15, wherein capturing an image of a light pattern includes capturing a plurality of images, each image being of the plurality of images including a light pattern formed on the object by the object being moved from the first position on the monitored region to at least a second position on the monitored region.

18. The method of claim 15, where the method further comprises:
providing a plurality of identifiable regions on the monitored region, each identifiable region being assigned an input value.

19. The method of claim 18, wherein:
capturing an image of a light pattern that forms on the object includes capturing the image that forms on the object when the object intersects the structured light substantially at one region in the plurality of identifiable regions; and
determining an input corresponding to the first position includes:
determining the identifiable region in the plurality of regions where the object intersects the structured light, and
identifying the input value assigned to the determined identifiable region.

20. The method of claim 19, wherein identifying the input value assigned to the determined identifiable region includes:
assigning an input value to each identifiable region in the plurality of identifiable regions; and
matching the determined identifiable region to the input value assigned to that identifiable region.

21. The method of claim 18, wherein providing a plurality of identifiable regions includes providing a virtual image of the plurality of identifiable regions.

22. The method of claim 21, wherein providing a plurality of identifiable regions includes visually indicating the input value assigned to one or more of the identifiable regions on the virtual image.

23. The method of claim 18, wherein providing a plurality of identifiable regions on the monitored region includes directing another light source to illuminate a set of keys, wherein each key in the set of keys corresponds to one of the identifiable regions in the plurality of identifiable regions.

24. The method of claim 23, wherein directing another light source to illuminate a set of keys includes illuminating an alphanumeric keypad.

25. The method of claim 23, wherein directing another light source to illuminate a set of keys includes illuminating a QWERTY keyboard.

26. The method of claim 18, wherein determining an input corresponding at least partially to the depth of the first position includes determining a first input value based at least partially on the depth of the first position, and determining a second input value based at least partially on a depth of the second position relative to where the image of the light pattern is captured.

27. The method of claim 26, further comprising determining an input value for one or more of the plurality of points that are crossed by the object as the object is moved from the first position to the second position.

28. The method of claim 15, wherein capturing an image of a light pattern that forms on the object includes capturing the image of the object at a plurality of points that are crossed by the object as the object is moved from the first to a second position on the monitored region.

29. The method of claim 15, wherein
directing structured light across the monitored region includes directing at least a first beam and a second beam across the monitored object; and
capturing an image of a light pattern that forms on the object includes capturing a first portion of the light pattern formed by the object intersecting the first beam, and capturing a second portion of the light pattern formed by the object intersecting the second beam;
measuring one or more geometric characteristics of the image of the light pattern includes measuring a gap distance between the first portion and the second portion of the light pattern.

30. The method of claim 15, wherein:
directing structured light across the monitored region includes generating a first beam to project across the monitored region; and
measuring one or more geometric characteristics of the image of the light pattern includes measuring a dimension of the light pattern formed by the object intersecting the first beam.

31. A method for determining depth of an object's placement onto a monitored region, the method comprising:
directing structured light across the monitored region, the structured light comprising a first beam and a second beam, wherein the structured light is capable of creating a geometric characteristic when forming a light pattern on the object in the monitored region;
capturing an image of a light pattern that forms on the object as a result of the object intersecting the structured light when the object is placed at a first position in the monitored region, the image of the light pattern including a first portion corresponding to where the object intersected the first beam, and a second portion corresponding to where the object intersected the second beam;
identifying a gap distance on the image between the first portion and second portion; and
approximating the depth of the first position based on the gap distance.

32. The method of claim 31, wherein capturing an image of a light pattern that forms on the object includes detecting reflected light using light sensitive pixels.

33. The method of claim 31, wherein approximating the depth of the first position includes mapping the gap distance to one value from a set of values, wherein each value in the set of values corresponds to a range of the gap distance.

34. The method of claim 31, wherein directing structured light across the monitored region includes generating the first beam to be proximate to a surface of the monitored region and to be thicker than the second beam.

35. The method of claim 31, wherein the method further comprises:
determining that the object intersects the structured light and makes contact with a surface of the monitored region at the first position using the tight pattern formed on the object intersecting the structured light.

36. The method of claim 31, wherein the method further comprises:
determining that the object intersects the structured light and makes contact with a surface of the monitored region at the first position using the gap distance identified from the image.

37. A method for determining depth of an object's placement onto a monitored region, the method comprising:
directing structured light across the monitored region, the structured light including a first beam, wherein the structured light is capable of creating a geometric characteristic when forming a light pattern on the object in the monitored region;
capturing an image of a light pattern that forms on the object as a result of the object intersecting the structured light when the object is placed at a first position in the monitored region;
identifying a dimension of the image of the light pattern; and
approximating the depth of the first position based on the dimension.

38. The method of claim 37, wherein capturing an image of a light pattern that forms on the object includes detecting reflected light using light-sensitive pixels.

39. The method of claim 37, wherein:
directing structured light across the monitored region includes generating a single beam to extend over the monitored region;
capturing an image of a light pattern that forms on the object includes capturing a light pattern formed by the object intersecting the single beam; and
identifying a dimension of the image of the light pattern includes measuring a dimension of the light pattern formed by the single beam.

40. The method of claim 39, measuring a dimension of the image of the light pattern includes measuring a height of the image of the light, wherein the height of the image of the light pattern is in a direction that is substantially orthonormal to a direction of the depth of the object's placement.

41. The method of claim 40, wherein approximating the distance based on the dimension includes mapping the height of the image of the light pattern to one value from a set of values, wherein each value in the set of values corresponds to a range of the measured height.

42. The method of claim 37, wherein the method further comprises:
determining that the object intersects the structured light and makes contact with a surface of the monitored region at the first position using the light pattern formed on the object intersecting the structured light.

43. The method of claim 37, wherein the method further comprises:
determining that the object intersects the structured light and makes contact with a surface of the monitored region at the first position using the dimension of the image of the light pattern formed on the object intersecting the structured light.

* * * * *